(12) United States Patent
Anantha et al.

(10) Patent No.: US 8,754,863 B2
(45) Date of Patent: Jun. 17, 2014

(54) FIXED DISPLAY SYSTEM INTERACTION WITH A COMMUNICATION DEVICE

(75) Inventors: Veeraraghavan A. Anantha, Lexington, MA (US); Lorne C. Liechty, Austin, TX (US); Patrenahalli M. Narendra, Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 293 days.

(21) Appl. No.: 13/242,785

(22) Filed: Sep. 23, 2011

(65) Prior Publication Data

US 2013/0076645 A1 Mar. 28, 2013

(51) Int. Cl.
*G06F 3/041* (2006.01)
*G09G 5/00* (2006.01)
*G06F 15/16* (2006.01)

(52) U.S. Cl.
USPC ............. 345/173; 345/2.3; 709/227; 726/7

(58) Field of Classification Search
None
See application file for complete search history.

(56) References Cited

U.S. PATENT DOCUMENTS

| | | |
|---|---|---|
| 2007/0188323 A1 | 8/2007 | Sinclair et al. |
| 2010/0222057 A1* | 9/2010 | Taylor et al. ............ 455/435.1 |
| 2011/0314168 A1* | 12/2011 | Bathiche et al. ............ 709/228 |
| 2012/0198532 A1* | 8/2012 | Headley ............................ 726/7 |

FOREIGN PATENT DOCUMENTS

| | | | |
|---|---|---|---|
| EP | 2224323 A1 * | 9/2010 | |
| EP | 2296080 A2 | 3/2011 | |
| JP | 2010056642 A | 3/2010 | |
| WO | 2011010925 A1 | 1/2011 | |
| WO | WO 2011031090 A2 * | 3/2011 | |
| WO | 2011049762 A1 | 4/2011 | |

OTHER PUBLICATIONS

International Search Report and Written Opinion for International Patent Application No. PCT/US2012/053914 mailed Nov. 28, 2012.

* cited by examiner

*Primary Examiner* — Joe H Cheng
*Assistant Examiner* — Kwin Xie
(74) *Attorney, Agent, or Firm* — Brian M. Mancini (57) ABSTRACT

A fixed display system that can interact with a communication device includes a display system including a fixed display operable to display information. A sensor is operable to provide a first signature upon an occurrence of a predetermined event, and the communication device is also operable to provide a second signature upon the occurrence of the same predetermined event. A processor compares the first and second signatures and determines whether these first and second signatures describe the same predetermined event, whereupon the processor initiates a communication session between the display system and the communication device. In addition, personal information of the user on the communication device may be used locally or partially/fully transferred to the display system to provide a personalized interactive experience for the user.

18 Claims, 5 Drawing Sheets

FIXED DISPLAY SYSTEM INTERACTION WITH A COMMUNICATION DEVICE

FIELD OF THE DISCLOSURE

The present invention relates generally to a display system and more particularly to a display system interacting with a mobile communication device.

BACKGROUND

Interactive display devices, such as can be found in entertainment or retail environments, can be implemented with various user interfaces. These interfaces can include at the simplest, a keyboard and/or mouse, and at the more advanced, an integral touchscreen and depth camera systems, and even further advanced using wireless communication with a user's communication device.

A keyboard and mouse are devices that are subject to mechanical damage, and once damaged, prevent use of the interactive display, which is undesirable, particularly in a retail environment, and are increasingly seen as being unsanitary. Touchscreens also encourage physical touching of the screen which is also seen as being unsanitary. Further, conventional touchscreens more than double the cost of displays. Wireless communication is increasingly being seen as a solution due to the convenience for the user and for its added functionality, e.g. obtaining external information, billing, etc.

Existing technologies such as Bluetooth require the user to explicitly go through a series of laborious steps to enable Bluetooth, i.e. pairing with each display encountered. These steps can be time-consuming, laborious, complicated and unfamiliar for the user. Another technology is scanning a barcode on the screen/display. However, this requires the steps of aiming the device camera, successfully scanning, etc. Another technique is entering a unique identification code on the display into the communication device. However, this requires time to enter the information accurately on a keyboard/touchscreen of the communication device. Another technology enables two smartphones to associate with one another by bumping them together to activate the accelerometers in both phones, whereupon a remote server will correlation the timing of the bump and location of the phones to identify which phones to associate. However, this technique would not work with a fixed display. Another technology uses an audio signal to check-in a phone entering a retail establishment. However, this technique requires a special purpose transmitter installed at each location requiring a check-in. Other technologies include near field communications and Radio Frequency Identification technologies. However, these technologies require a special reader and transmitter. In addition to the specific limitations of the existing technologies listed, none of the existing technologies provide a mechanism for a user to have a personalized session with a display system without transferring/inputting key personal information to the display.

What is needed is a simple technique for a user with a communication device to initiate and have an associated session with a fixed external display, that is optionally personalized.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel and simple technique for a user with a communication device to initiate and have an associated session with a fixed external display. The present invention provides a robust and automatic technique for associating a user's communication device, such as a smartphone, to a fixed external display system, such as an interactive kiosk. The present invention provides a natural interactive session that requires minimal time and effort for a user to effect. The present invention does not require a user to remember or enter passwords, text, or other cumbersome processes to start a session between a communication device and a display. The present invention also provides robust security ensuring that the communication device associates with the correct connected display with a high degree of confidence. The present invention also provides a mechanism provide for a user to have a personalized session with a display system without transferring/inputting key personal information to the display.

It is envisioned that the present invention can be used effectively in a great number of scenarios. For example, the present invention can: present a personalized welcome screen for the user interacting with a large display, transfer a shopping session between a smartphone loyalty application and an in-store kiosk (and vice-versa), provide detailed product browsing on a large display or smartphone for a product that user has in a shopping cart, can associate a product shown on a large display with a user's social networking site, purchase a set of products in a shopping cart displayed on a large display by using the users' personal mobile wallet, check-in and printout a boarding pass at an airport, print out a receipt, perform a financial transaction with an automatic teller machine, authenticate a transaction, etc. These are only a few of the many use cases enabling the present invention.

Figure 1:
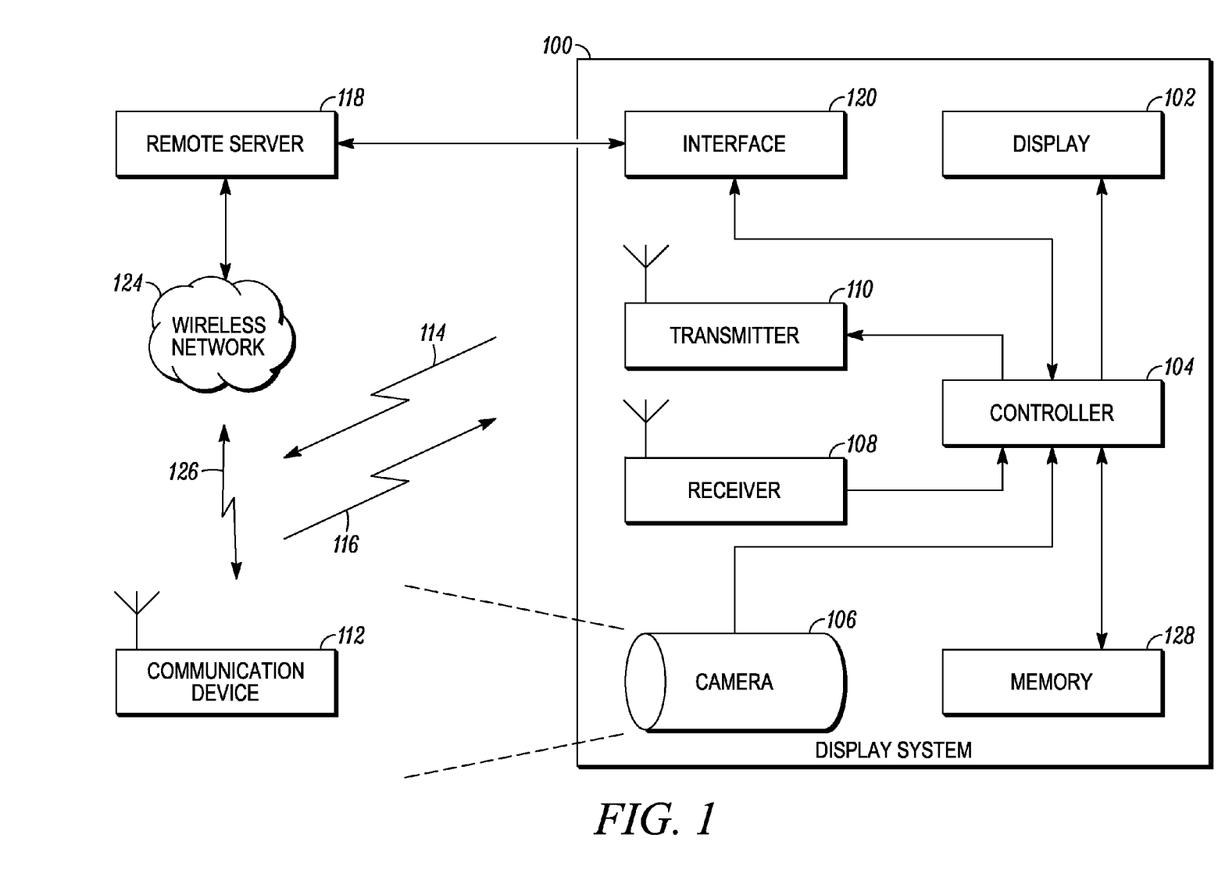
FIG. 1 is a simplified block view of display system and communication device, in accordance with various embodiments of the present invention.

FIG. 1 is a simplified block diagram of various embodiments of the present invention. A display system 100 is operable to communicate with a communication device 112, such as a currently available smartphone for example. Optionally, the display system and/or the communication device can also communicate with a remote server 118 through a wired or wireless protocol, such as an Internet connection 122 and/or a wireless communication network 124 using a wireless communication protocol 126. It is envisioned that the communication device can include a dedicated software application to enable some features of the present invention, although this is not a requirement. Also, a controller 104 of the display system can include a software application to enable some features of the present invention.

The display system 100 includes a fixed display 102 operable to display information to a user. The display system also includes a sensor, which can include one or more of a touchscreen display 102, a (depth) camera 106, and a wireless receiver 108, in various embodiments of the present invention. The sensor is operable to detect events that can occur in proximity to the display system and also to detect the presence of the communication device. The display system can optionally include a communication interface 120 operable to use a predefined communication protocol for communication with a remote server, such as through an Internet protocol, for example. The display system can also include a memory 128. The modules and functions of the display system are controlled through one or more of a controller 104 or processor.

The sensor is coupled to the display system and operable to provide a first signature upon an occurrence of a predetermined event. The communication device is also operable to provide a second signature upon the occurrence of the same predetermined event, as detected by its own existing sensor, such as its accelerometer or camera. It should be noted that the sensors used by the display system and the communication device can be different mechanisms, and that these different mechanisms can still be used to recognize the same predetermined event.

The predetermined event is known, or provided by a processor of the remote server, to the display controller. The predetermined event is associated with a specific user(s) or communication device(s) and is also used to simultaneously identify and authenticate the user/device, and initiate a communication session between the display system and the communication device. Alternatively, without a remote server, the predetermined event can be known by one or both of the display and the communication device. The predetermined event can be stored in a separate memory of one or more of the remote server, display system, and the communication device. The display system and the communication device will provide respective signatures of the detection of the event.

A processor is operable to compare the first and second signatures and determine whether these first and second signatures describe the same predetermined event. If a match is found, the processor initiates a communication session between the display system and the communication device. The processor can be the controller 104, the remote server 118, or the communication device 112, in accordance with various embodiments of the present invention as detailed below. As used herein, the term predetermined event can also refer to a particular sequence of events. However, it should be recognized that different events of the sequence of events could be detectable by different sensors. For example, the sequence of events may be an emitted audio tone followed by an RF signal. These two events can be detected by different sensors, but still make up one predetermined event.

Figure 2:
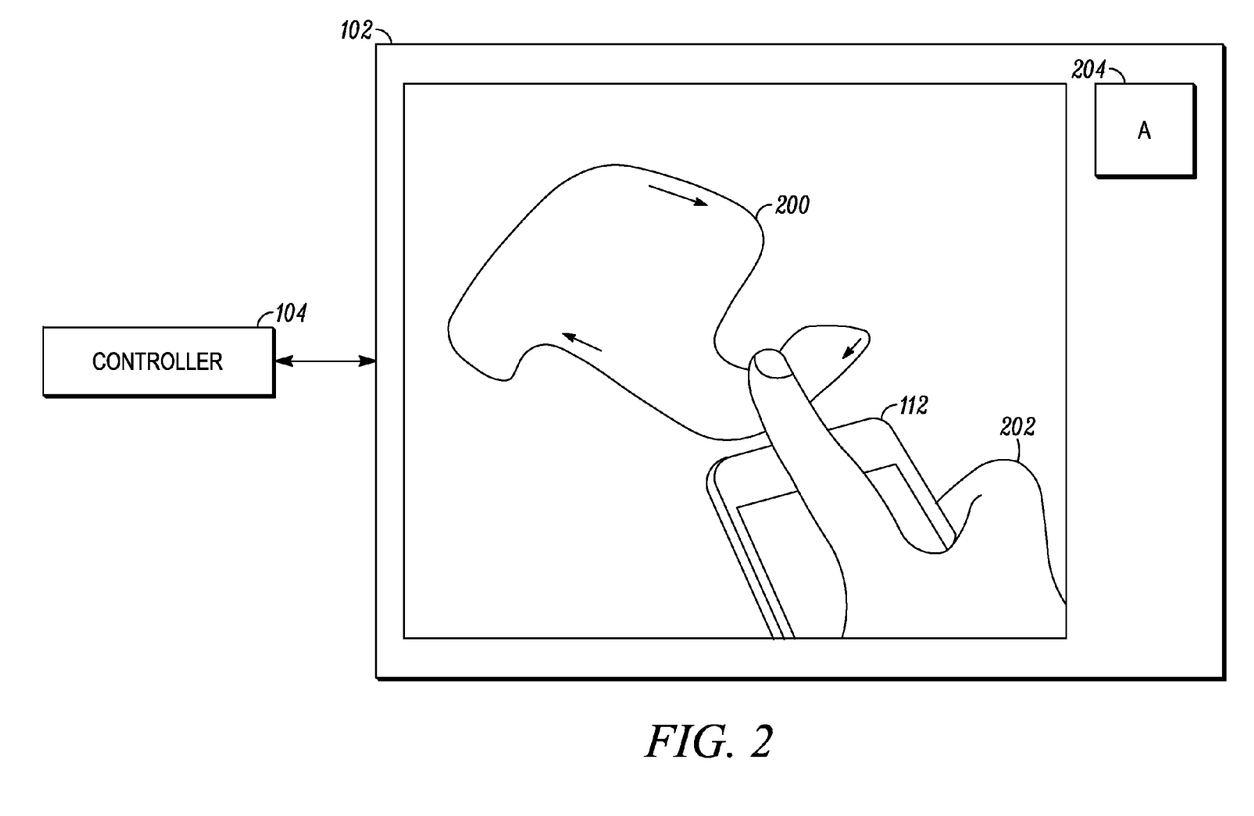
FIG. 2 is a front view of a display showing a user interacting with a touchscreen display, in accordance with one embodiment of the present invention.

FIG. 2 is a front view of the display 102 of the display system. The display is a touchscreen display, which acts as the sensor in this first embodiment, and which is operable to detect an object, such as a stylus, user's finger, or other object, touching or moving on the display while the user is holding the communication device. In this embodiment, the predetermined event is the tracing of a predefined pattern 200 on the touchscreen by the object. The predefined pattern can be a simple, unique, randomly-generated pattern shown on the display for the user to follow, or the display screen can be blank and the user will trace a pattern known only to that user on the screen for the system to compare with predefined patterns stored in a memory. Alternatively, the predetermined event can be a touching of an icon 204 (or a unique series of icons) on the display. If the touch or pattern signature matches a predetermined touch pattern stored in the memory of the remote server or display system, then this is an affirmative first indication. The predetermined touch pattern can also be associated with an identity of a particular user 202 of the communication device that is assigned to this pattern. As a result, a match of the signature identifies and authenticates the user or communication device.

As the communication device 112 is being held by the user, an existing three-dimensional accelerometer or gyroscope sensor of the communication device is also able to follow the motion of the predefined pattern 200 or touch of the icon (or series of icons). If the motion or touch signature matches the predetermined pattern or touch stored in the memory of the remote server or communication device, then this provides an affirmative second indication. It should be noted that the user does not need to precisely trace the pattern, since there need not be a direct comparison with the displayed shape, but just a comparison using the captured signatures on the display system and the communication device to achieve the closest best match among all possible signatures being generated at that point in time. This second signature can also include information identifying the particular user of communication device assigned to this signature. As a result, the second signature can also identify and authenticate the user or communication device.

The first and second signatures can be provided to any of the display system, communication device, or remote server, which can act as the processor to determine whether the first and second signatures match the predetermined event to a high degree of confidence. For example (referring back to FIG. 1), if the controller 104 of the display system acts as the processor, then the display system can receive 116 the second signature from the communication device for comparison, and initiate the session upon a match with the predetermined event. If the communication device acts as the processor, then the display system can transmit 114 the first signature to the communication device for comparison with the predetermined event, where the communication device initiates the communication session upon a match by sending a predefined confirmation signal known to the display system for verification, such that the display system can establish the session. If the remote server 118 acts as the processor, then the display system can send 120, 122 the first signature to the remote server and the communication device can send 126, 124 the second signature to the remote server for comparison with the predetermined event stored in the memory of the remote server.

Alternative, the display system and communication device can compare their signatures to the predetermined event stored in each of their respective memories. And the display system and communication device can simply send affirmative indications along with identities of the display system and communication device to the remote server so that the remote server can initiate the communication session between the display system and communication device. The signatures or indications can also include a time stamp for the remote server to further verify the match. If there is a match of signatures to the predetermined event or if there are two affirmative indicators, the processor will have the identification information, and can associate and initiate a communication session between the display system and communication device. The communication session can then be directly between the devices through the transmitter 110 and receiver 108 via 114 and 116, or through the Internet via 126, 124, 118, 122, 120.

The communication session can include data exchange between the display system and the communication device. For example, the data exchange can include personal data that might be on the communication device allowing for a personalized user-interaction with the connected display so that the display system can deliver targeted information to the communication device of user, either by displaying or transferring the information. For example, personal information on the communication device such as shopping history can trigger a personalized display of contents on the display. In another example, a user's "shopping cart" on the communication device can be transferred to the display system upon association, where the user can interact in more detail on an interactive display to explore product details, etc. Subsequently, the modified "shopping cart" and product details can be transferred back to the communication device so that the user can carry the experience on their phone after the session ends.

During the communication session, the display system can use the communication device as a proxy to achieve personalized interaction with the user, without actually transferring the personal information from the communication device to the display system. The user can have a personalized experience with the display system by using personal information (such as user name and/or password) stored in the communication device, even though this personal information is never transferred from the communication device to the display system. For example, if the user likes a specific product shown on the display, touching a social network icon on the display next to the product can send targeted information via the communication device to a social network site of the user, using the social network application on the communication device. In this way, the display system can send information to the social network site without having knowledge of the site access parameters, which are only known to the communication device. In another example, the user's store loyalty card information and associated prior shopping history stored on their communication device can be used to personalize the welcome message and products displayed to the user on the display system even though the customer's loyalty card information (such as phone number, access information, total reward points, etc.) are only known to the communication device. In yet another example, the user can buy a set of products in their shopping cart as shown on the display system by using their personalized mobile wallet that is available on their communication device, without transferring any personal information (such as credit card information) from the communication device to the display system.

After initial association, an ongoing series of event-based association techniques are used to maintain the session over time. For example, the processor is operable to conduct or obtain periodic presence checks using the sensor or a supplemental sensor to confirm that the communication device or user is still proximal to the display system. Upon a determination that the communication device or user is no longer present, the processor is then operable to automatically terminate the communication session. For example, the receiver 108 could be used as a supplemental sensor, wherein if the receiver is still in communication with the device 112, then the presence of the device is confirmed. If the receiver no longer receives communication from the device, after a particular time expires, the processor will know to terminate the session. The camera 106 can be used as a supplemental sensor in a similar manner, in recognizing the user is still proximal to the display, possibly through facial recognition or simply that the user is still present in the image. Optionally, the user can explicitly end session through the communication device or through the selection of an icon on the display.

In a practical example, a user with a smartphone can enter a store. The user can walk up to an informational kiosk looking for information about a product. The user can start an application on their smartphone indicating a desire for communication with the kiosk. The application can locate and associate the smartphone with a Wi-Fi server of a local network of the store. The server can identify the user and then direct the kiosk to display a predetermined pattern on its touchscreen related to this identified user. The kiosk directs the user to trace this pattern on the touchscreen while holding the smartphone. The application on the smartphone transfers information about the phone's accelerometer to the server while the user is tracing the pattern. The kiosk also transfers information about the touchscreen to the server while the user is tracing the pattern. If the signatures of the information from the kiosk and smartphone match, then the server authenticates and initiates a communication session between the kiosk and phone. It should be noted that it is not necessary for the user to complete the tracing of the pattern if a sufficient match is found during the event. At this point, the user has "checked-in" to the kiosk and has an authenticated session with the kiosk. The kiosk can display a personalized "welcome message" to the user by using personal information from the communication device. The kiosk and phone are allowed to communicate and/or transfer information about the product (e.g. location in the store, description, price, user's "like" of the product, etc.) while the user is present with the kiosk. The user can purchase a product displayed on the screen using their mobile wallet on their communication device. The user can then walk away, whereupon the kiosk will detect, by a camera and timer for example, that the user is no longer present and direct the server to terminate the communication session.

Figure 3:
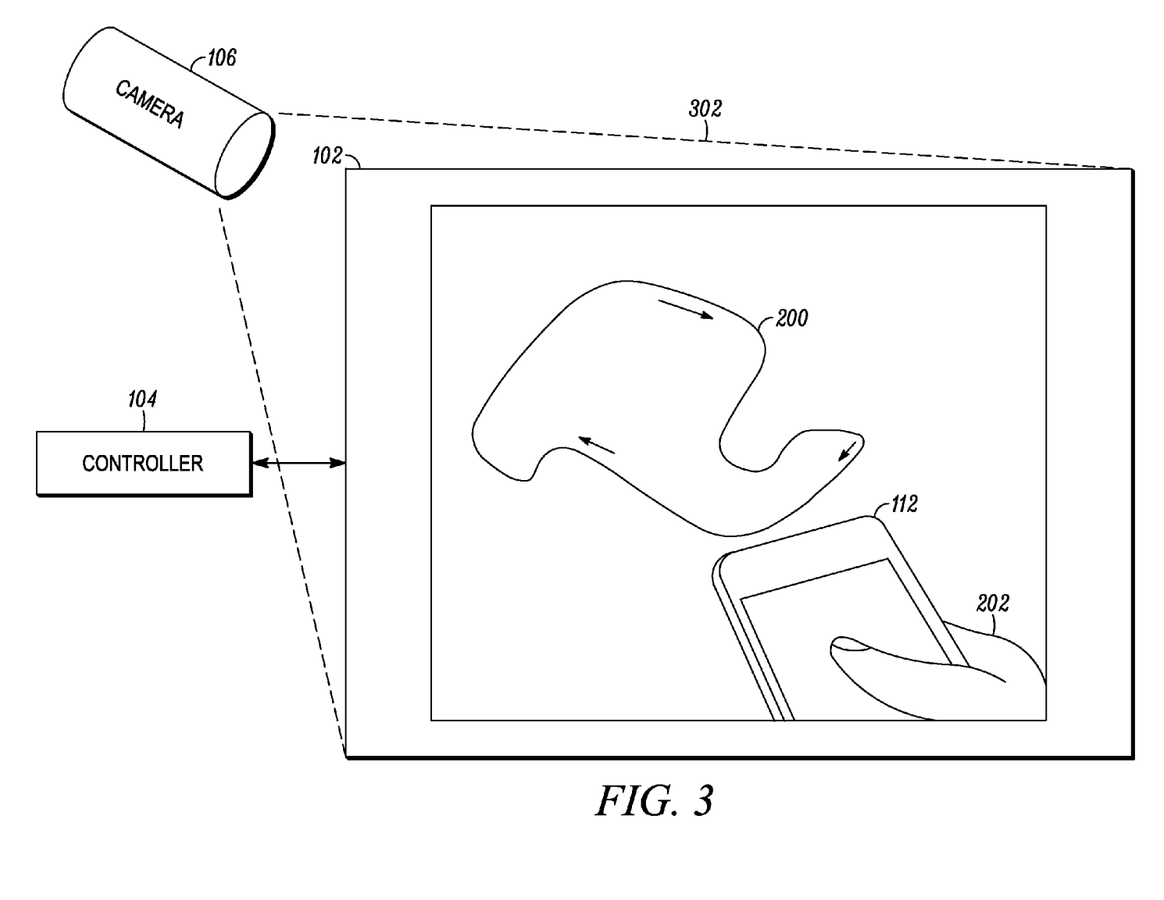
FIG. 3 is a front view of a display showing a user interacting with a depth camera, in accordance with another embodiment of the present invention.
Figure 4:
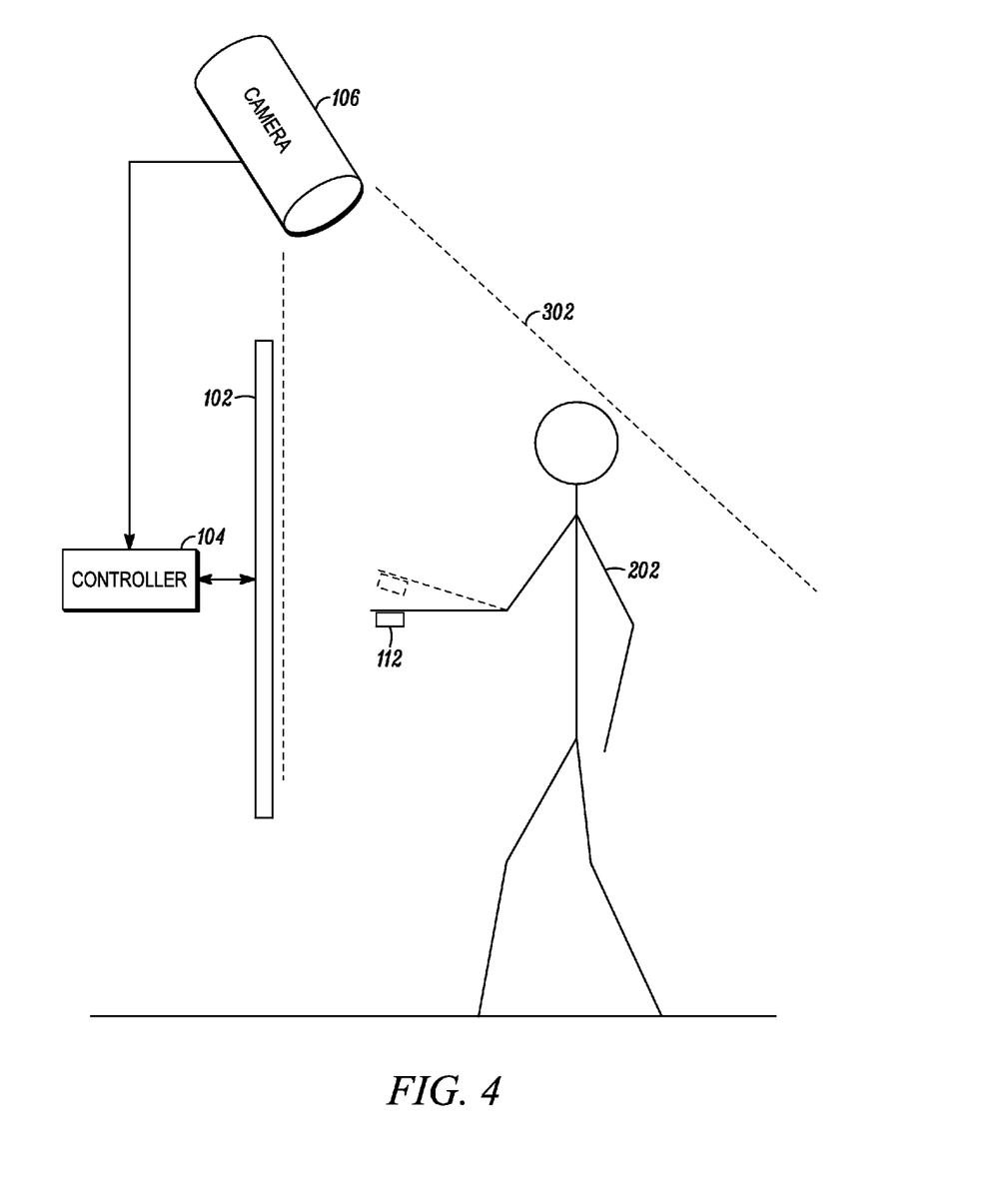
FIG. 4 is a side view of FIG. 3.

FIG. 3 and FIG. 4 are respective front and side views of the display 102 of the display system in another embodiment of the present invention. The display need not be a touchscreen display as in the first embodiment. Instead, a (two or three dimensional time-of-flight or structured light) depth camera 106 or optical sensor acts as the sensor in this embodiment. The camera is operable to detect the movement and position of an object, such as a stylus, user's finger, or other object, moving within a field of view 302 in proximity to, and covering the entire surface area of, the display (but not necessarily touching the display) while the user is holding the communication device. In this embodiment, the predetermined event is a specific time-space trajectory of an object tracing a predefined pattern 200 in a space just above the surface of the display. The trajectory can be a simple, unique, randomly-generated pattern shown on the display for the user to follow, or the display screen can be blank and the user will project a trajectory known only to that user using the communication device for the system to compare with predefined trajectories stored in its memory 128. It should be noted that the trajectory could be in two or three dimensions. If a signature of the movement matches a stored predetermined time-space trajectory, then the processor can determine an affirmative first indication.

As the communication device 112 is being held by the user 202, the accelerometer of the communication device is also able to follow the trajectory of the predefined pattern 200 and provide the three-dimensional motion vectors (time trace) of the communication device. Alternatively, the communication device can capture and derive scene motion vectors using the camera or (global) positioning system of the device in order to determine the trajectory. If a signature of the trajectory matches the predetermined pattern, then the processor can provide an affirmative second indication. First and second affirmative indications direct the processor to initiate the communication session, similar to the first embodiment, described above.

In yet another embodiment of the present invention, a camera or optical imager acts as the sensor. The camera is operable to acquire a reference image, such as a particular user's face, when the user is in proximity to the display. For example, a user can hold a smartphone vertically in front of him or her such that user's face can be captured with the front-facing camera on the phone. Then the camera or imager of the display system (facing the user) can also capture an image of the user's face. The captured images can include a time and location stamp and are the first and second signatures for the processor to compare and validate a match. In this embodiment, the predetermined event is the recognition of the reference image or face. If the signatures of the respective reference images or face match a stored image or face, then the processor has affirmative indications and can initiate the communication session, similar to the first embodiment, described above.

In yet another embodiment of the present invention, referring back to FIG. 1, the receiver 108 acts as the sensor. The receiver is operable to acquire a predetermined signal 116 from the communication device when the device is in proximity to the display. In this embodiment, the predetermined event is the sending of this predetermined signal 116 by the communication device. The signal could be an audio (where the receiver 108 is a microphone), optical, or RF signal having a particular protocol, pattern, code, message, sequence, and/or signature recognizable by the controller 104 or remote server. For example, an audio signal can have a unique sound pattern and an RF signal such as a Wi-Fi beacon signal can have a unique SSID or SSID sequence at a given time. This signal can be acquired by the receiver for the controller, or sent to the remote server (along with an optional time stamp), as the second signature. If the signal matches one stored in the memory of the remote server or display system, this is an affirmative first indication. In this case, the signal itself can act as the second signature from the communication device. For example, the communication device can also send a copy of the signal with a time stamp to the remote server as the second signature. If there is a match to the stored signal (and a match of the time stamps), then this is both an affirmative first and second indication, which can then be treated similarly to the first embodiment, described above.

In yet another similar embodiment of the present invention, the communication device 112 acts as the sensor. The communication device is operable to acquire a predetermined signal 114 from the transmitter 110 of the display system when the device is in proximity to the display. In this embodiment, the predetermined event is the sending of this predetermined signal 114 by the display system. As before, the signal could be an audio, optical, or RF signal having a particular protocol, message, sequence, and/or signature recognizable by the communication device 112. If the signal matches a stored signal, then this is an affirmative second indication. In this case, the signal itself can act as the first signature from the display system. Optionally, the signal can be sent to the remote server along with a time stamp as the first signature, and the display system can also send a copy of the signal with a time stamp to the remote server as a second signature. If the two signatures (and time stamps) provide a match to the stored signal, then this is both an affirmative first and second indication, which can then be treated similarly to those of the first embodiment, described above. For example, the communication device could initiate the communication session by sending a predetermined confirmation signal known to the display system for verification, such that the controller 104 or processor can establish the communication session. Optionally, the remote server can initiate the session. It should be noted that a low power Wi-Fi beacon can be directed with appropriate antennas to a specific area near the display, which can be used to eliminate extraneous phones from authenticating with the display.

In variations of the above embodiments the display system can have a unique code either on the frame or on the screen itself. The communication device camera can captures the code, and transmit the code to the remote server, which can then associate the display system with the communication device. In a variant to above, a unique time varying code is presented on the display screen (rather than a static one). In another variant to above, the communication device has the unique code on its screen and a camera on the display system captures it to match it with the user. In another variation, the camera of the communication device records a unique fixed pattern or visual code on the ceiling or floor of the retail establishment as the user approaches the display system. This image is matched against the expected result to authenticate user. For example, the pattern is placed very close to the display system so that only a communication device that is close to the display will see the code. In this way, a user can keep the communication device in its natural position as they open a loyalty application, for example, and the front/rear camera of the phone can capture the unique image. In yet another variation, a light emitting diode of the communication device can be flashed in a unique sequence and captured by the display camera as a "gross" signature. No precise aiming of the two cameras will be required for this to work. This sequence code is transmitted from the communication device to the remote server for matching as above.

As used herein, the processor or controller can comprise basic components such as, but not limited to, microprocessors, digital signal processors, microcontrollers, computers, drivers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm or logic flow, those skilled in the art are aware of the many design and development techniques available to implement user equipment that performs the given logic. Therefore, the processor represents a known apparatus that has been adapted, in accordance with the description herein, to implement various embodiments of the present invention.

Figure 5:
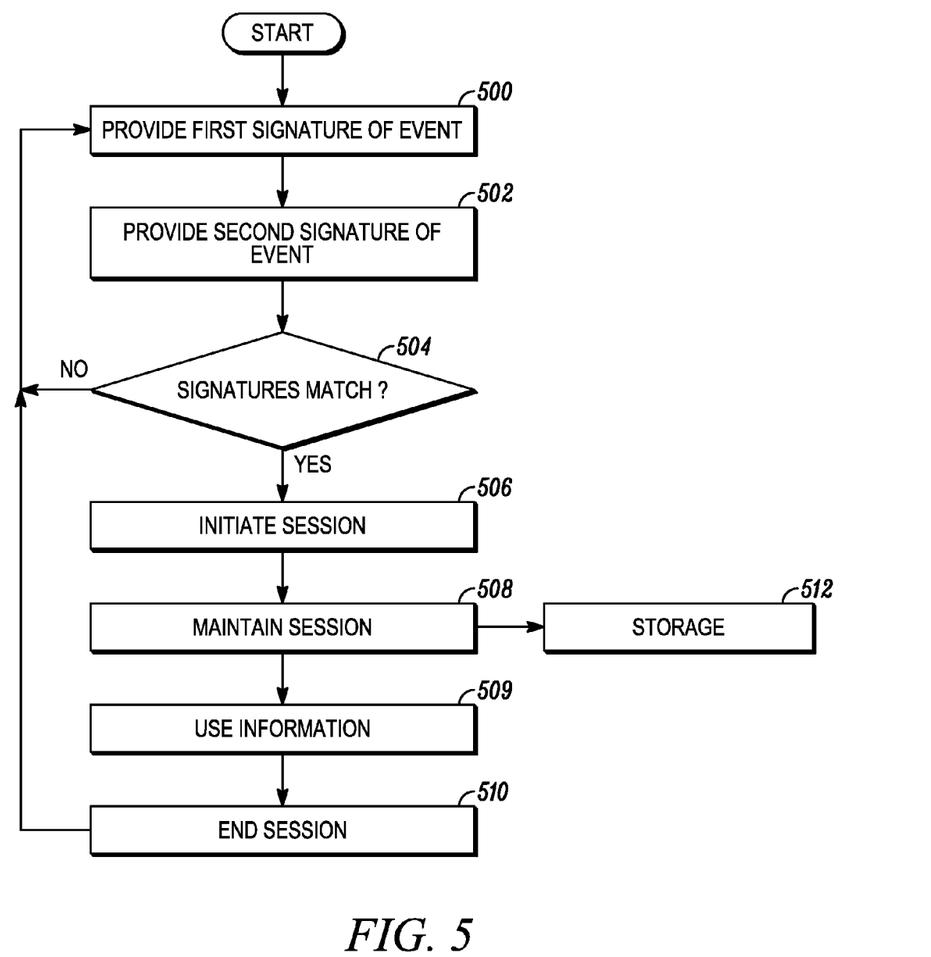
FIG. 5 is a simplified flow diagram demonstrating a method, in accordance with various embodiments of the present invention.

FIG. 5 illustrates a flowchart of a method for a fixed display system to interact with a communication device, in accordance with the present invention.

The method starts by providing 500 a first signature from a sensor of the display system upon an occurrence of a predetermined event.

A next step includes providing 502 a second signature from the communication device upon the occurrence of the same predetermined event.

A next step includes comparing 504 the first and second signatures to determine whether these first and second signatures describe the same predetermined event.

A next step includes initiating 506 a communication session between the display system and the communication device.

A next step includes maintaining 508 the communication session by confirming the proximity of the communication device to the display system.

A next (optional) step includes using 509 personal information on the communication device (which may be used locally or partially/fully transferred to the display system) to provide a personalized experience for the user interacting with the display system. For example, initially the display system does not know anything about the user or what social media services that are used by the user. Once the communication device associates to the display system, it can tell the display system that the user has a Facebook™ account for example (where a priori knowledge of Facebook™ is not required of the display system), and that this account allows the user to perform certain actions (e.g., to "Like" or share something). Now that the display system knows this functional information it can also present these actions to the user as options in its user interface, but with the added benefit of leveraging its proprietary data that was unavailable to the user's communication device. So, for example, the user would be unable to "Like" a product from a store's inventory using their phone alone, but when connected to the store's display system the user can now use the display's user interface to "Like" that product. In this process the display system does not actually perform the "Like" operation (since no a priori knowledge of Facebook™ is required)—the display system simply provides a reference to the product to the phone and requests that the phone perform this operation for it as a proxy. This type of "personal proxy" allows a communication device to perform all personalized actions for the display system so that the user never has to provide any personal information to the display system. In this way, no personal information is transmitted (e.g., no username, no password, etc.) to the display system. The display system only provides a set of actions where the phone can act as a personal proxy for the display.

A next step includes ending 510 the communication session.

An optional step includes storing 512 information targeted to the user.

Advantageously, the present invention provides a system that allows the association of a communication device, such as a smartphone, with a fixed display system. The association occurs by a user performing natural hand-motions without having to type anything on the display or smartphone.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A fixed display system operable to interact with a separate mobile communication device, comprising:
   a display system including a fixed display operable to display information;
   a first sensor coupled to the display system and operable to provide a first signature and first timestamp upon detecting an occurrence of a predetermined event;
   a second sensor coupled to the communication device and also operable to provide a second signature and second timestamp upon detecting the occurrence of the same predetermined event; and
   a processor operable to compare the first and second signatures and timestamps and determine whether these first and second signatures describe the same predetermined event that identifies and authenticates the communication device, whereupon the processor initiates a communication session between the display system and the communication device such that the communication device performs a personalized action as a proxy for the display system without the communication device providing any personal information to the display system, wherein the display system provides a set of actions for the communication device to perform using personal information stored on the communication device.

2. The system of claim 1 wherein the communication device second sensor utilizes a sensing mechanism different than the display first sensor.

3. The system of claim 1, wherein the first sensor is a camera and the second sensor of the communication device includes a camera, and wherein the predetermined event is the acquisition of the same reference image by both cameras.

4. The system of claim 1, wherein the processor is a remote processor operable to communicate with both the display system and the communication device, wherein the processor is operable to store the predetermined event for comparison with the first and second signatures.

5. The system of claim 1, wherein the processor is operable to store the predetermined event for comparison with the first and second signatures.

6. The system of claim 1, wherein the predetermined event is the sending of a predetermined signal by the communication device, and wherein the sending of the predetermined signal is the second signature.

7. The system of claim 1, wherein the predetermined event is the sending of a predetermined signal by the display system, and wherein the sending of the predetermined signal is the first signature.

8. The system of claim 7, wherein the processor is in the communication device, and wherein the processor initiates the communication session by sending a predetermined confirmation signal known to the display system for verification.

9. The system of claim 1, wherein upon initiation of the communication session, the processor is further operable to conduct periodic presence checks using a supplemental sensor to confirm that the communication device is still proximal to the display system.

10. The system of claim 9, wherein upon a determination that the communication device is no longer present, the processor is operable to terminate the communication session.

11. The system of claim 9, wherein the determination that the communication device is no longer present is in response to the expiry of a timer.

12. The system of claim 1, wherein targeted information can be provided back to the communication device in response to the personalized action.

13. The system of claim 1, wherein the communication session includes transferring information from the display to a remote storage system.

14. The system of claim 1, wherein the communication session includes transferring information from the communication device to a remote storage system.

15. A fixed display system operable to interact with a separate mobile communication device, comprising:
    a display system including a fixed display operable to display information;
    a first sensor coupled to the display system and operable to provide a first signature and first timestamp upon detecting an occurrence of a predetermined event, wherein the first sensor is a touchscreen of the display operable to trace a changing position on the touchscreen of a user touching the screen while holding the communication device;
    a second sensor coupled to the communication device and also operable to provide a second signature and second timestamp upon detecting the occurrence of the same predetermined event, wherein the second sensor of the communication device includes an accelerometer, and wherein the predetermined event is a specific pattern traced on the touchscreen detectable by both the touchscreen and the accelerometer; and
    a processor operable to compare the first and second signatures and timestamps and determine whether these first and second signatures describe the same predetermined event that identifies and authenticates the communication device, whereupon the processor initiates a communication session between the display system and the communication device.

16. The A fixed display system operable to interact with a separate mobile communication device, comprising:
    a display system including a fixed display operable to display information;
    a first sensor coupled to the display system and operable to provide a first signature and first timestamp upon detecting an occurrence of a predetermined event, wherein the first sensor is a touchscreen of the display operable to detect the selection of an icon on the touchscreen by a user tapping that icon while holding the communication device;
    a second sensor coupled to the communication device and also operable to provide a second signature and second timestamp upon detecting the occurrence of the same predetermined event, wherein the second sensor of the communication device includes an accelerometer, and wherein the predetermined event is the tapping of the touchscreen detectable by both the touchscreen and the accelerometer; and a processor operable to compare the first and second signatures and timestamps and determine whether these first and second signatures describe the same predetermined event that identifies and authenticates the communication device, whereupon the processor initiates a communication session between the display system and the communication device.

17. A fixed display system operable to interact with a separate mobile communication device, comprising:
   a display system including a fixed display operable to display information;
   a first sensor coupled to the display system and operable to provide a first signature and first timestamp upon detecting an occurrence of a predetermined event, wherein the first sensor is a camera operable to detect a changing spatial position of the communication device in time;
   a second sensor coupled to the communication device and also operable to provide a second signature and second timestamp upon detecting the occurrence of the same predetermined event, wherein the second sensor of the communication device includes an accelerometer, and wherein the predetermined event is a specific time-space trajectory of the communication device detectable by both the optical sensor and the accelerometer; and
   a processor operable to compare the first and second signatures and timestamps and determine whether these first and second signatures describe the same predetermined event that identifies and authenticates the communication device, whereupon the processor initiates a communication session between the display system and the communication device.

18. A method for a fixed display system to interact with a separate mobile communication device, the method comprising the steps of:
   providing a first signature from a first sensor of the display system and a first timestamp upon detecting an occurrence of a predetermined event,
   providing a second signature from a second sensor of the communication device and a second timestamp upon detecting the occurrence of the same predetermined event;
   comparing the first and second signatures and timestamps to determine whether these first and second signatures describe the same predetermined event that identifies and authenticates the communication device; and
   initiating a communication session between the display system and the communication device, whereupon the communication device performs a personalized action as a proxy for the display system without the communication device providing any personal information to the display system, wherein the display system provides a set of actions for the communication device to perform using personal information stored on the communication device.

* * * * *